United States Patent
Spanton et al.

(10) Patent No.: US 9,881,351 B2
(45) Date of Patent: Jan. 30, 2018

(54) REMOTE TRANSLATION, AGGREGATION AND DISTRIBUTION OF COMPUTER PROGRAM RESOURCES IN GRAPHICS PROCESSING UNIT EMULATION

(71) Applicant: Microsoft Technology Licensing, LLC, Redmond, WA (US)

(72) Inventors: Brian Spanton, Bothell, WA (US); Barry Bond, Redmond, WA (US); Robert Francis, Woodinville, WA (US); Eric Heutchy, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/740,132

(22) Filed: Jun. 15, 2015

(65) Prior Publication Data

US 2016/0364831 A1    Dec. 15, 2016

(51) Int. Cl.
| | |
|---|---|
| *G06F 9/45* | (2006.01) |
| *G06T 1/20* | (2006.01) |
| *G06T 15/00* | (2011.01) |
| *G06F 9/455* | (2006.01) |

(52) U.S. Cl.
CPC .............. *G06T 1/20* (2013.01); *G06F 9/4552* (2013.01); *G06T 15/005* (2013.01)

(58) Field of Classification Search
CPC ........... G06F 8/41; G06F 8/65; G06F 9/45504
USPC ........................................ 717/138, 140, 172
See application file for complete search history.

(56) References Cited

U.S. PATENT DOCUMENTS

| | | | |
|---|---|---|---|
| 6,115,054 A | 9/2000 | Giles | |
| 6,578,197 B1 * | 6/2003 | Peercy | .................. G06F 8/443 |
| | | | 717/140 |
| 6,731,288 B2 | 5/2004 | Parsons et al. | |
| 6,937,246 B2 | 8/2005 | Munshi et al. | |
| 6,947,049 B2 | 9/2005 | Spitzer et al. | |
| 6,975,325 B2 | 12/2005 | Morein et al. | |

(Continued)

OTHER PUBLICATIONS

"Shader Development", Published on: Aug. 26, 2014 Available at: https://docs.unrealengine.com/latest/INT/Programming/Rendering/ShaderDevelopment/index.html.

(Continued)

*Primary Examiner* — Phillip H Nguyen
(74) *Attorney, Agent, or Firm* — Patent GC LLC

(57) ABSTRACT

Resource processing, such as shader translation, during run time of an application on an emulated platform, can be performed asynchronously from emulation of the application. One or more server computers can be configured to perform such processing remotely from the computers executing the emulation. The one or more server computers can receive resources for processing from multiple computers. The one or more server computers aggregate the resources received from the multiple computers for different applications and process those resources. For example, multiple shaders, discovered from multiple different emulations of an application on multiple computers, are translated and organized by the one or more server computers. The translated shaders can be packaged as an update to the application and redistributed to the computers using the application. Such an update can be installed on the computers as a set of translated shaders for use in the emulation of the application.

18 Claims, 11 Drawing Sheets

(56) References Cited

U.S. PATENT DOCUMENTS

| | | | |
|---|---|---|---|
| 7,015,909 B1* | 3/2006 | Morgan, III | G06T 15/005 345/426 |
| 7,174,436 B1 | 2/2007 | Langendorf et al. | |
| 7,219,085 B2 | 5/2007 | Buck et al. | |
| 7,245,302 B1 | 7/2007 | Donham et al. | |
| 7,324,106 B1* | 1/2008 | Cabral | G06F 8/441 345/426 |
| 7,385,608 B1 | 6/2008 | Baldwin | |
| 7,439,979 B1* | 10/2008 | Allen | G06T 1/20 345/506 |
| 7,447,997 B2 | 11/2008 | Colle | |
| 7,466,314 B2 | 12/2008 | Loop et al. | |
| 7,623,132 B1 | 11/2009 | Bastos et al. | |
| 7,652,666 B2 | 1/2010 | Pellacini et al. | |
| 7,676,448 B2 | 3/2010 | Henderson et al. | |
| 7,750,913 B1* | 7/2010 | Parenteau | G06F 8/30 345/426 |
| 7,817,151 B2 | 10/2010 | Zhang | |
| 7,817,154 B1 | 10/2010 | Sams et al. | |
| 7,821,521 B2* | 10/2010 | Jackson | G06F 3/14 345/552 |
| 8,001,531 B1* | 8/2011 | Rideout | G06F 11/362 709/217 |
| 8,006,232 B1 | 8/2011 | Rideout et al. | |
| 8,081,184 B1 | 12/2011 | Nordquist | |
| 8,174,534 B2 | 5/2012 | Jiao | |
| 8,289,325 B2 | 10/2012 | Green et al. | |
| 8,325,184 B2* | 12/2012 | Jiao | G06T 15/005 345/426 |
| 8,365,153 B2* | 1/2013 | Chen | G06F 8/41 345/505 |
| 8,482,561 B2 | 7/2013 | McCombe et al. | |
| 8,643,659 B1 | 2/2014 | Baldwin | |
| 8,711,159 B2 | 4/2014 | Li et al. | |
| 8,854,368 B1 | 10/2014 | Russell | |
| 2002/0190989 A1 | 12/2002 | Kamata et al. | |
| 2003/0009748 A1 | 1/2003 | Glanville et al. | |
| 2003/0076722 A1 | 4/2003 | Solomon | |
| 2004/0012596 A1 | 1/2004 | Allen et al. | |
| 2004/0207622 A1* | 10/2004 | Deering | G06T 15/50 345/426 |
| 2005/0140672 A1 | 6/2005 | Hubbell | |
| 2005/0162437 A1* | 7/2005 | Morein | G06T 15/80 345/557 |
| 2005/0235287 A1 | 10/2005 | Harper | |
| 2006/0039468 A1 | 2/2006 | Emerson et al. | |
| 2006/0098017 A1* | 5/2006 | Tarditi, Jr. | G06F 8/45 345/505 |
| 2006/0098018 A1* | 5/2006 | Tarditi, Jr. | G06F 8/45 345/505 |
| 2006/0098019 A1* | 5/2006 | Tarditi, Jr. | G06F 8/45 345/505 |
| 2006/0170680 A1 | 8/2006 | Peeper et al. | |
| 2007/0006178 A1 | 1/2007 | Tan | |
| 2007/0091104 A1 | 4/2007 | Singh et al. | |
| 2007/0260446 A1 | 11/2007 | Suba et al. | |
| 2007/0283158 A1 | 12/2007 | Danseglio | |
| 2008/0024490 A1 | 1/2008 | Loop et al. | |
| 2008/0052701 A1* | 2/2008 | Abernethy | G06F 8/67 717/170 |
| 2008/0074430 A1* | 3/2008 | Jiao | G06T 15/005 345/506 |
| 2008/0140380 A1 | 6/2008 | Marsyla et al. | |
| 2008/0204473 A1 | 8/2008 | Jackson | |
| 2008/0218527 A1 | 9/2008 | Romanick | |
| 2009/0051687 A1 | 2/2009 | Kato et al. | |
| 2009/0073177 A1 | 3/2009 | Jiao et al. | |
| 2009/0109219 A1 | 4/2009 | DeCoro et al. | |
| 2009/0110295 A1 | 4/2009 | Ogaki et al. | |
| 2009/0113402 A1* | 4/2009 | Chen | G06F 8/41 717/140 |
| 2009/0164205 A1 | 6/2009 | Sargaison | |
| 2009/0251476 A1 | 10/2009 | Jiao et al. | |
| 2010/0013842 A1 | 1/2010 | Green et al. | |
| 2010/0082813 A1* | 4/2010 | Li | H04L 67/16 709/226 |
| 2010/0110083 A1 | 5/2010 | Paltashev et al. | |
| 2010/0214301 A1* | 8/2010 | Li | G06T 1/20 345/522 |
| 2011/0084976 A1 | 4/2011 | Duluk et al. | |
| 2011/0173476 A1 | 7/2011 | Reed | |
| 2012/0306877 A1 | 12/2012 | Rosasco | |
| 2013/0145202 A1 | 6/2013 | Hartog et al. | |
| 2013/0238938 A1 | 9/2013 | Baliga et al. | |
| 2014/0043333 A1 | 2/2014 | Narayanan et al. | |
| 2014/0063029 A1 | 3/2014 | Oneppo et al. | |
| 2014/0092092 A1 | 4/2014 | Li et al. | |
| 2014/0292783 A1 | 10/2014 | Iwagaki et al. | |
| 2014/0362100 A1 | 12/2014 | Cerny et al. | |
| 2015/0022541 A1* | 1/2015 | Zelsnack | G06F 8/443 345/589 |
| 2015/0091931 A1 | 4/2015 | Pelton et al. | |

OTHER PUBLICATIONS

Office Action in U.S. Appl. No. 14/739,988 dated May 17, 2016.

"Benefits of the Windows Display Driver Model (WDDM)", Retrieved from: <<https://msdn.microsoft.com/en-us/library/windows/hardware/ff538245(v=vs.85).aspx>>, Dec. 10, 2012, 3 Pages.

"Can you Prewarm a Shader on a Background Thread with its Own Context?", Retrieved from <<http://stackoverflow.com/questions/8797361/can-you-prewarm-a-shader-on-a-background-thread-with-its-own-context>>, Retrieved on: Apr. 22, 2015, 4 Pages.

"Hash Function", Retrieved from: <<http://en.wikipedia.org/wiki/Hash_function>>, Retrieved on: Dec. 3, 2007, 5 Pages.

"Final Office Action Issued in U.S. Appl. No. 12/361,216", dated Feb. 13, 2012, 27 Pages.

"Final Office Action Issued in U.S. Appl. No. 12/361,216", dated Mar. 7, 2013, 30 Pages.

"Final Office Action Issued in U.S. Appl. No. 12/361,216", dated Oct. 9, 2013, 36 Pages.

"Non Final Office Action Issued in U.S. Appl. No. 12/361,216", dated Jul. 3, 2013, 32 Pages.

"Non Final Office Action Issued in U.S. Appl. No. 12/361,216", dated Jul. 27, 2012, 29 Pages.

"Non Final Office Action Issued in U.S. Appl. No. 12/361,216", dated Oct. 18, 2011, 24 Pages.

"Final Office Action Issued in U.S. Appl. No. 12/391,066", dated Nov. 30, 2012, 30 Pages.

"Non Final Office Action Issued in U.S. Appl. No. 12/391,066", dated Jul. 8, 2013, 11 Pages.

"Non Final Office Action Issued in U.S. Appl. No. 12/391,066", dated Jun. 19, 2012, 25 Pages.

"Notice of Allowance Issued in U.S. Appl. No. 12/391,066", dated Dec. 16, 2013, 7 Pages.

"Final Office Action Issued in U.S. Appl. No. 14/739,988", dated Dec. 6, 2016, 21 Pages.

"Notice of Allowance Issued in U.S. Appl. No. 14/739,988", dated Mar. 16, 2017, 9 Pages.

Antonov, Michael, "Asynchronous Timewarp Examined", Retrieved from: <<https://web.archive.org/web/20150303170708/https://www.oculus.com/blog/asynchronous-timewarp/>>, Mar. 3, 2015, 6 Pages.

Botelho, et al., "Perfect Hashing for Data Management Applications", In arXiv preprint cs/0702159, Feb. 27, 2007, 12 Pages.

* cited by examiner

US 9,881,351 B2

REMOTE TRANSLATION, AGGREGATION AND DISTRIBUTION OF COMPUTER PROGRAM RESOURCES IN GRAPHICS PROCESSING UNIT EMULATION

BACKGROUND

Some computers include a graphics processing unit (GPU) which is a co-processor of a central processing unit. A graphics processing unit has a parallel processing architecture specifically designed to efficiently process graphics rendering operations, but also is applicable to similar kinds of operations that can be readily executed in parallel.

When a software developer creates an application for use on a computer with a GPU, an executable computer program is created. This executable computer program is generated for use on a particular type of computer with a combination of elements, typically called a platform, which includes the type of central processing unit, the type of graphics processing unit and the type of operating system. This executable program includes computer program code that can be executed by the GPU of that platform. Such an executable computer program would not run on another platform that is otherwise the same as the original platform, but has a different GPU, unless that different GPU had the same interfaces and instruction set as the GPU in the original platform.

Often, to address such a problem, the software developer may port an application to generate versions of the application that run on different platforms. However, porting does not assist end users who have a version of the application for one platform and who would like to use that version on another platform. For example, a game produced for one game console would not be executable on another game console unless that other game console incorporated the platform of the original game console in some way.

One way to incorporate the platform of a first computer in a second computer is to provide computer software on the second computer that emulates the platform of the first computer. When an application is executed on the second computer, if the application is determined to be an executable for the first computer, the second computer runs an emulator on its central processing unit which configures the second computer to provide interfaces to interact with the application in the same manner of the first computer, and translate commands and data between the application and the operating system, central processing unit and graphics processing unit of the second computer.

One challenge with emulating applications that use a graphics processing unit is the inclusion in such applications of small programs, called shaders, which are executed by the graphics processing unit. These shaders are executable code for an original GPU of the first computer, and need to be translated to be processed by a target GPU in the second computer. Generally, translating a shader is dependent upon a context in which the shader is called during execution of the application. Thus, shaders generally cannot be identified and translated statically prior to execution of the application. Other resources, e.g., graphics resources such as large textures, may have similar characteristics and are identified and processed during execution. Thus, such processing of resources is performed by the emulator during execution of the application, i.e., at "run time". While results from processing resources at run time can be stored and re-used in a form of cache, an application can use a large number of shaders and other graphics resources. Processing such resources at run time can consume significant processor and memory resources, affecting performance of the application.

SUMMARY

This Summary is provided to introduce a selection of concepts in a simplified form that are further described below in the Detailed Description. This Summary is intended neither to identify key or essential features, nor to limit the scope, of the claimed subject matter.

Resource processing, such as shader translation, during run time of an application on an emulated platform, can be performed asynchronously from emulation of the application. One or more server computers can be configured to perform such processing remotely from the computers executing the emulation. The one or more server computers can receive resources for processing from multiple computers. The one or more server computers aggregate the resources received from the multiple computers for different applications and process those resources. For example, multiple shaders, discovered from multiple different emulations of an application on multiple computers, are translated and organized by the one or more server computers. The translated shaders can be packaged as an update to the application and redistributed to the computers using the application. Such an update can be installed on the computers as a set of translated shaders for use in the emulation of the application.

On the computers that perform emulation of applications, processed resources for those applications, such as translated shaders and generated textures, can be stored in a cache. This cache can be populated with processed resources obtained from the one or more server computers and loaded into the cache at runtime.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
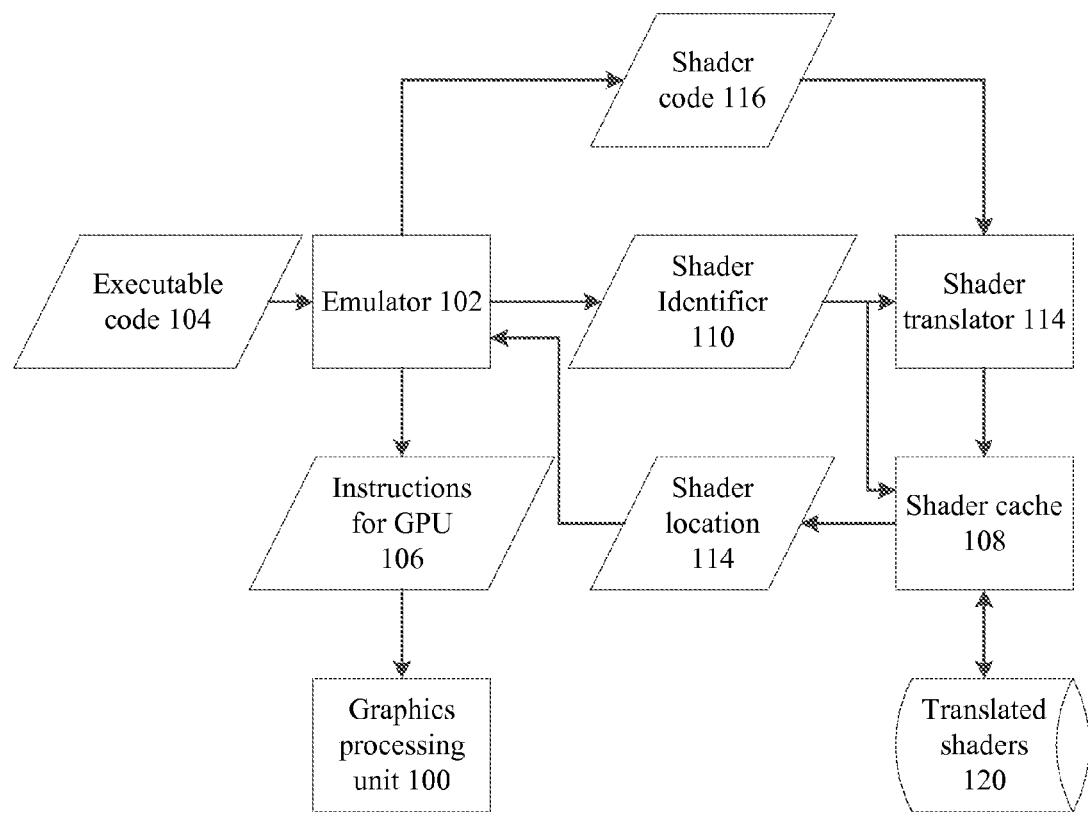
FIG. 1 is a block diagram of an example computer platform with an emulator and a graphics processing unit.

Referring to FIG. 1, an example implementation of a computer with an emulator and a graphics processing unit will now be described.

In FIG. 1, a computer (such as described generally in FIG. 12) includes a graphics processing unit 100. An emulator 102 is an application executed on the central processing unit (not shown) of the computer, which processes executable code 104 for a first type of graphics processing unit and outputs executable code 106 to a second type of graphics processing unit, i.e., the actual or target graphics processing unit 100 of this computer. An example of such an emulator is described in U.S. Patent Publication 2010/0214301, entitled "VGPU: A Real Time GPU Emulator", by Jinyu Li et al., which is hereby incorporated by reference.

The executable code 104 processed by the emulator 102 can include one or more shaders, one or more graphics resources and/or yet other types of resources that the emulator processes at run time. For such resources, the computer includes a corresponding cache, such as a shader cache 108. Similar caches can be maintained for other types of resources. Given executable code 104 that includes a reference to a resource, such as a shader, an identifier 110 for the resource can be computed and used to access the cache.

For shaders, the identifier can be computed by applying a function, such as a hash function, to the executable code for the shader as input to the emulator, and other context information for the shader. The emulator 102 uses this identifier to access the shader cache 108, determining whether the executable code 112 for the GPU 100 for the shader is available in the shader cache 108.

If the executable code 112 for GPU 100 for the shader is not in the shader cache 108, then the emulator submits executable code 116 for the shader for translation to a shader translator 114. The shader translator 114 can be executed as an asynchronous thread that is separate from the main thread of the emulator 102. The shader translator processes executable code 116 from the emulator to generate executable code 112 for the GPU 100, and stores this executable code 112 as a translated shader in the shader cache 108.

In operation using a typical application running on a computer with a GPU 100, the emulator receives executable code 104 that typically first provides an instruction to load a shader to the GPU 100. After the shader is loaded, the executable code 104 then may include instructions to generate data, such as a draw command, using the loaded shader. Using the shader cache 108 and shader translator 114, the emulator can determine whether a shader is in the shader cache 108, and, if not, can instruct the shader translator 114 to translate the shader and load the translated shader into the cache. If the shader is in the shader cache, the emulator can submit an instruction to the GPU 100 to load the shader from the shader cache. Subsequently, if another instruction, such as a draw instruction, refers to that shader, and the shader is not in the cache, then that instruction can be skipped, as described in more detail below. Otherwise, if the shader is in the cache, then a draw instruction can be submitted to the GPU 100.

In some implementations, the shader cache can be loaded from a distribution of translated shaders 120 for an emulated application. In such an implementation, a shader translator can be omitted. Such a distribution can be part of a program of ongoing distribution of translated shaders for the emulated application.

Figure 2:
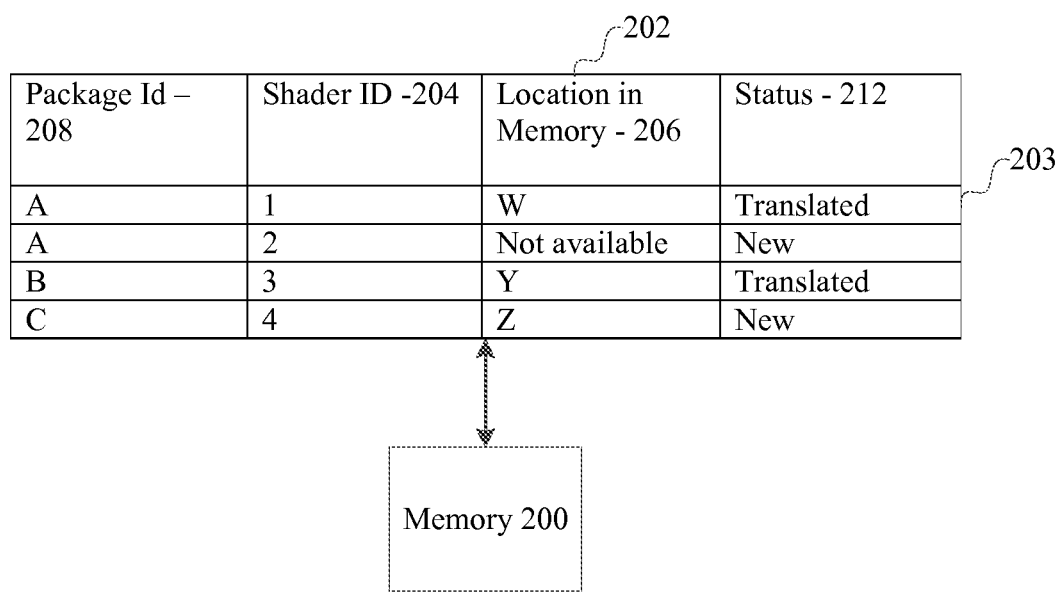
FIG. 2 is a diagram of an example implementation of a shader cache.

An example implementation for the structure of the shader cache will now be described in more detail in connection with FIG. 2. The shader cache generally includes memory 200 for storing executable code for the GPU 100 for a plurality of shaders. An index 202 for this memory includes an entry 203 for each shader. An entry can include a shader identifier 204, a reference 206 to a location in memory 200 in which the executable code for the GPU 100 for this shader is stored. The reference 206 can be, for example, an address in memory or a special code indicating that the shader has not yet been translated or is otherwise unavailable in the memory 200. The shader identification can further include other information, such as an identifier 208 of the application that includes this shader as part of that application. An entry also can include an indicator 212 of whether the shader has been recently translated. For example, this indicator 212 can be set to a value, such as a bit or a date or text value, indicating whether the shader is new with respect to any installation of translated shaders.

As described in more detail below, an entry can be created in the index 202 in response to the emulator 102 determining that a shader is not in the cache 108 or in response to the emulator 102 submitting the shader to the shader translator 114 for translation. Upon creating the entry, the emulator can set the values in the entry to default values until the shader is translated and stored in the memory 200.

Having now described an example implementation of an emulator and a graphics processing unit, with an associated shader cache and shader translator, more details of an example implementation will now be described in connection with FIGS. 3 through 12.

In this implementation, resource processing, such as shader translation, during run time of an application on an emulated platform, can be performed asynchronously from emulation of the application. One or more server computers can be configured to perform such processing remotely from the computers executing the emulation. The one or more server computers can receive resources for processing from multiple computers. The one or more server computers aggregate the resources received from the multiple computers for different applications and process those resources. For example, multiple shaders, discovered from multiple different emulations of an application on multiple computers, are translated and organized by the one or more server computers. The translated shaders can be packaged as an update to the application and redistributed to the computers using the application. Such an update can be installed on the computers as a set of translated shaders for use in the emulation of the application.

On the computers that perform emulation of applications, processed resources for those applications, such as translated shaders and generated textures, can be stored in a cache. This cache can be populated with processed resources obtained from the one or more server computers and loaded into the cache at runtime or as part of the application installation on the computer.

Figure 3A:
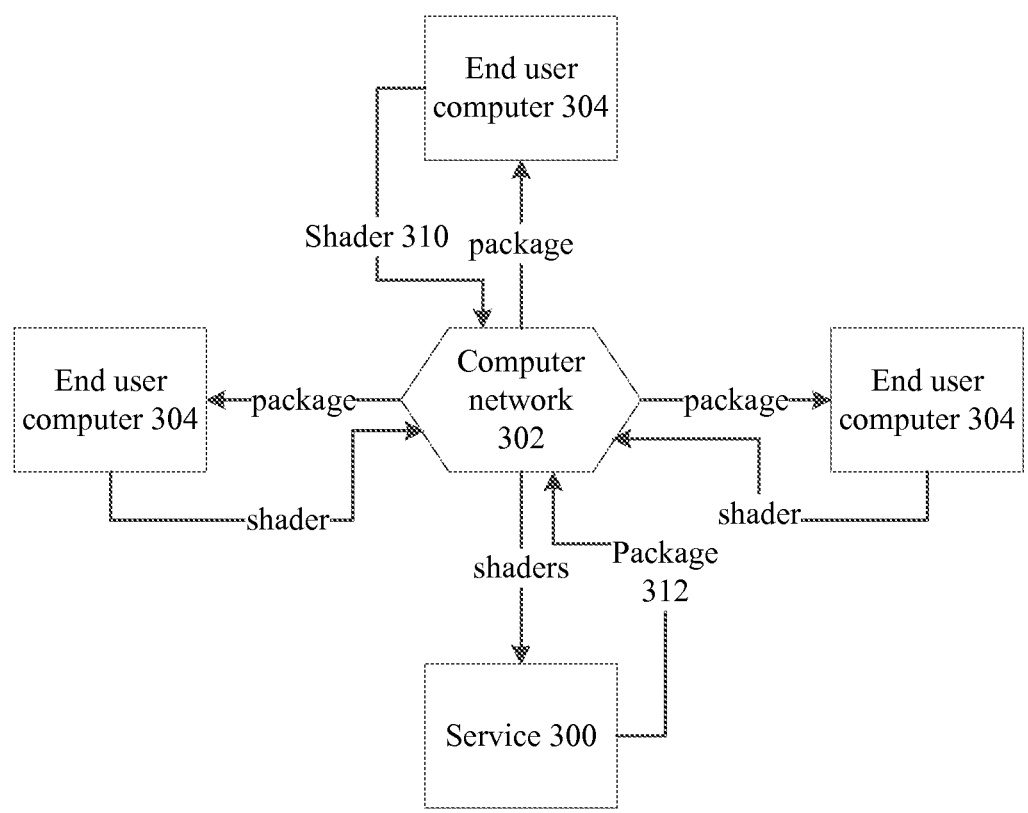
FIG. 3A is a block diagram of one or more server computers coordinating with multiple computers to aggregate resources for processing.
Figure 12:
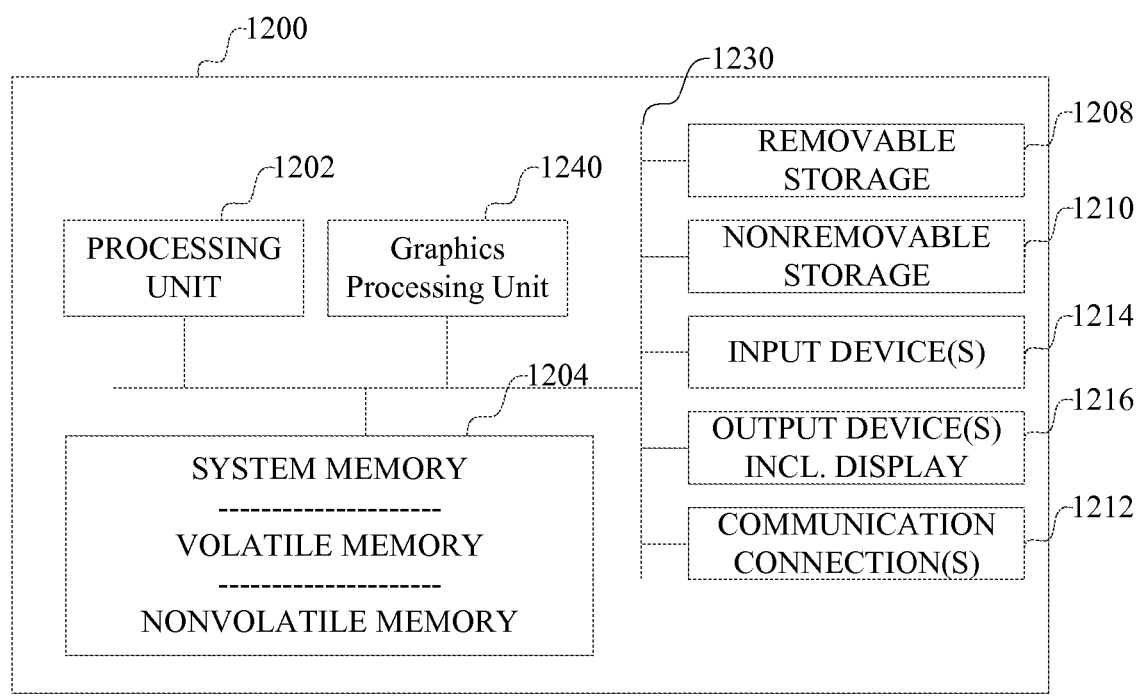
FIG. 12 is block diagram for an example implementation of a general purpose computer.

FIG. 3A is a block diagram of one or more server computers coordinating with multiple computers to aggregate resources for processing. A service 300 is implemented using one or more server computers, such as a computer shown in FIG. 12. The service 300 is connected over a computer network 302 to multiple computers 304, which are implemented using a computer such as shown in FIGS. 1 and 12. The multiple computers 304 can be owned by the same entity, such as a software developer, or by different entities, such as different consumers or other end users. The computer network can be, for example, a local area network, a wide area network, a private network, a publicly-accessible network, the internet, and the like. In this system, computers 304 send shaders 310 over the computer network 302 to the service 300. The service 300 translates and aggregates the translated shaders into packages 312, which are distributed over the computer network 302 to the computers 304.

Figure 3B:
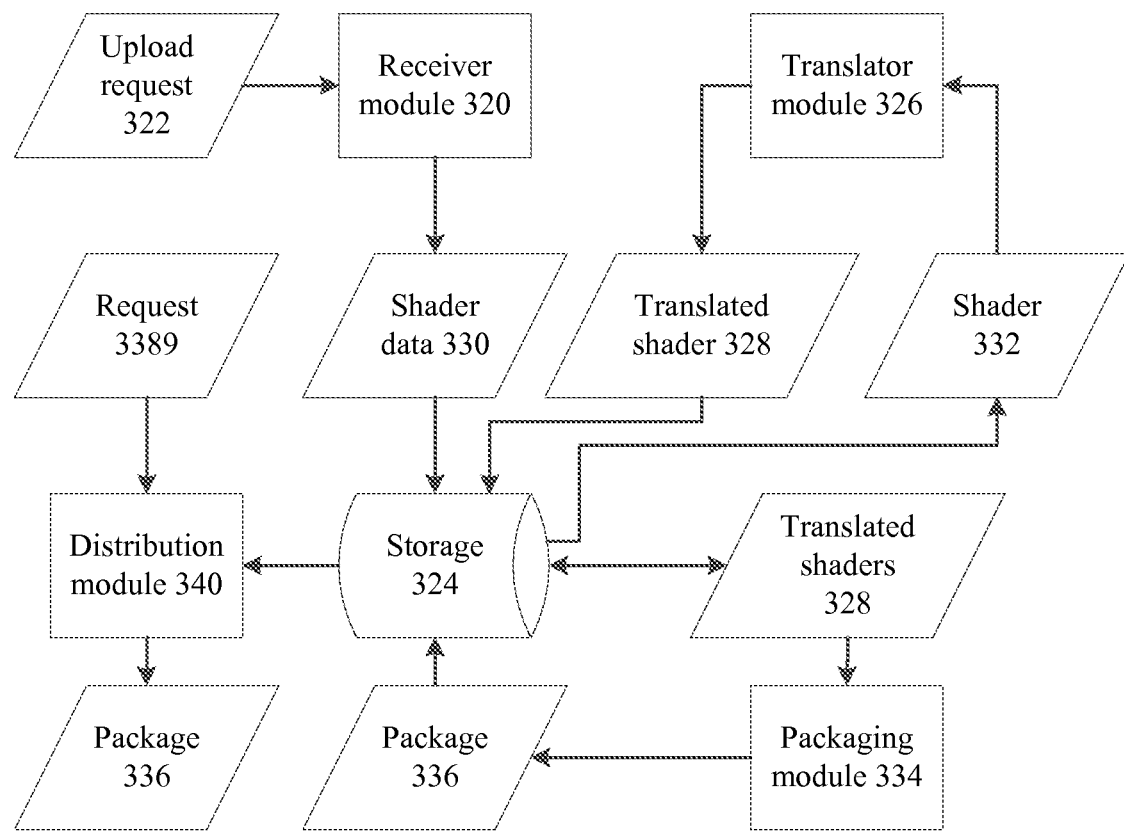
FIG. 3B is a data flow diagram of components implemented on one or more server computers in an example implementation.

FIG. 3B is a data flow diagram of components implemented on one or more server computers in an example implementation of the service 300 of FIG. 3A.

A receiver module 320 receives an upload request 322 from a computer. The upload request includes information identifying an application being emulated by the computer, and a shader to be translated, along with the context for that shader. This data 330 can be extracted by the receive module and stored in storage 324. A translator module 326 accesses the storage 324 and translates uploaded shaders 332. The translated shaders 328 are stored in the storage 324. A packaging module 334 periodically identifies all of the translated shaders 328 stored in the storage 324 and packages them into an installable update package 336 for an application, which also is stored in storage 324. With the shaders from multiple computers uploaded and translated, and the translated shaders aggregated into update packages, the computers can periodically request the update packages from the service to obtain translated shaders. Thus, a download module 340 receives requests 338 from computers for updates to applications used by those computers. The download module 340 accesses the storage 324 to retrieve the requested update packages and transmit the update packages to the computers.

Figure 4:
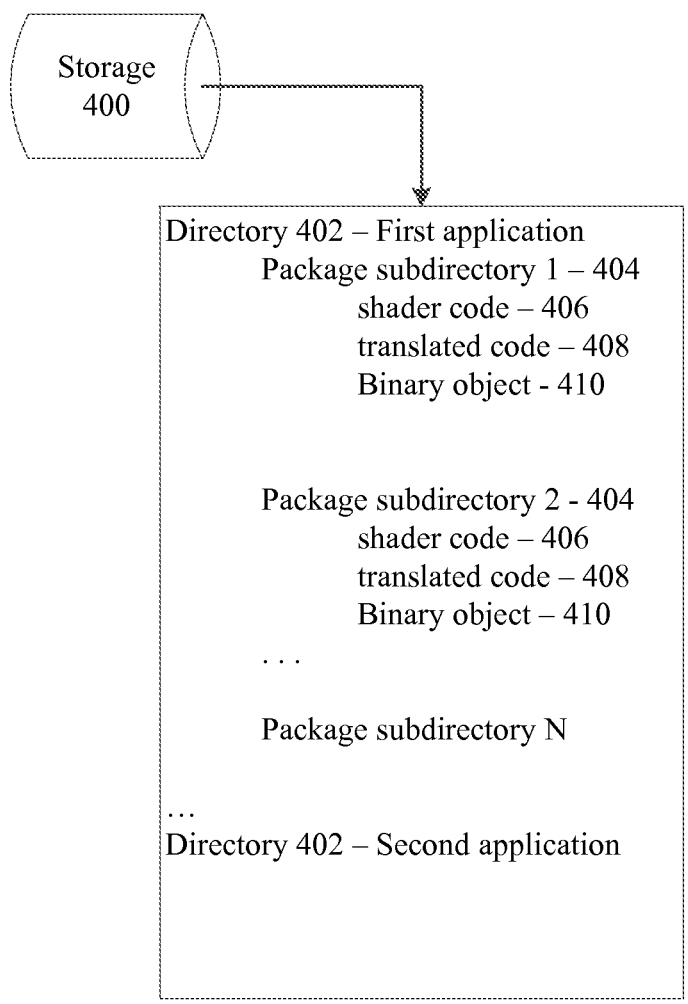
FIG. 4 is an illustration of a directory structure used to organize shader data aggregated from multiple end user computers

To facilitate such aggregation, the storage 324 can be configured in a number of different ways to organize shaders, translated shaders and update packages for multiple applications. An example implementation of such storage organization is shown in FIG. 4.

In this example implementation, a server computer manages storage 400 for shaders using one or more directories 402 in a file system used by the server computer to manage access to storage. Each application, for which the service is processing resources, can have its own top level directory 402. An application can be, for example, a game with three-dimensional graphics. Each update, or package, to be distributed for this application can have its own subdirectory 404. Files for each package are stored in the subdirectory 404 for the package. Such files can include, for example, shaders received from end user computers (which can be stored in a directory 406), and translated shaders (which can be stored in a directory 408). The file names for the received shaders and the translated shaders can be based on a computed identifier for the shader, based on the identity of the shader and its context, as is done for the shader cache. After an update package is produced, a large binary object 410 is produced including the translated shaders for this package. A package can be cumulative of all prior packages or additive to prior packages. After a package is completed, a new directory can be created and used for subsequently received shaders for the next package to be created for the application.

To perform such aggregation, each end user computer transmits shaders to the service.

In an alternative implementation, the end user computers may translate shaders and transmit translated shaders to the service. In this implementation, each end user computer has a translator and periodically transmits translated shaders to the service, indicating the application with which each shader is associated. Having end user computers translate shaders reduces performance of those computers and leaves the system more vulnerable to introduction of malicious code.

In one implementation, the end user computers transmit the original code of the shaders, or a pre-processed version of such code, to the service. The service then performs the translation remotely from the end user computers, which improves performance of the end user computers. Further, translation is performed consistently by the service, in an environment that is less vulnerable to introduction of malicious code. An example of this implementation will be described in connection with FIGS. 5A and 5B.

Figure 5A:
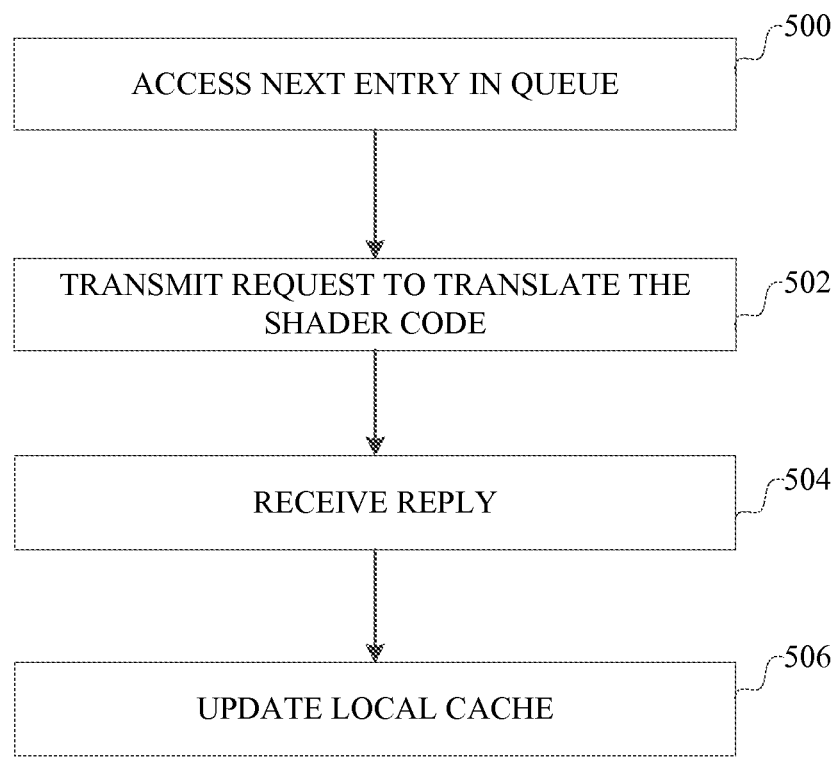
FIG. 5A is a flow chart illustrating an example implementation of remote translation by an end user computer.

In FIG. 5A, a process implemented by the end user computer will first be described. This example is based on an example implementation described in copending United States patent application entitled "Asynchronous Translation of Computer Program Resources in Graphics Processing Unit Emulation", by Ke Deng et al, filed on even date herewith and hereby incorporated by reference. In this implementation, the end user computer has an asynchronous thread which performs translation using a queue of shaders as an input indicating shaders to be translated. The implementation described in connection with FIG. 5A uses such an implementation to have the end user computer instruct the service to remotely translate a shader.

Thus, in FIG. 5A, the end user computer 500 accesses a next shader in its queue. The end user computer then transmits 502 a request to translate the shader to the service. After some time passes, the end user computer receives a reply 504. Based on the reply, the end user computer can update 506 its local shader cache with appropriate status information. For example, the server computer can reply with the code for the translated shader, in response to which the end user computer loads the code into the cache and updates a cache index. As another example, the server computer can reply with an acknowledgment, indicating that the shader has been queued for processing, in response to which the end user computer can mark the shader in the cache index as being in process. Alternatively, the end user computer can transmit each instance of a shader for translation to the service and update its cache after receiving an update package of translated shaders from the service.

Figure 5B:
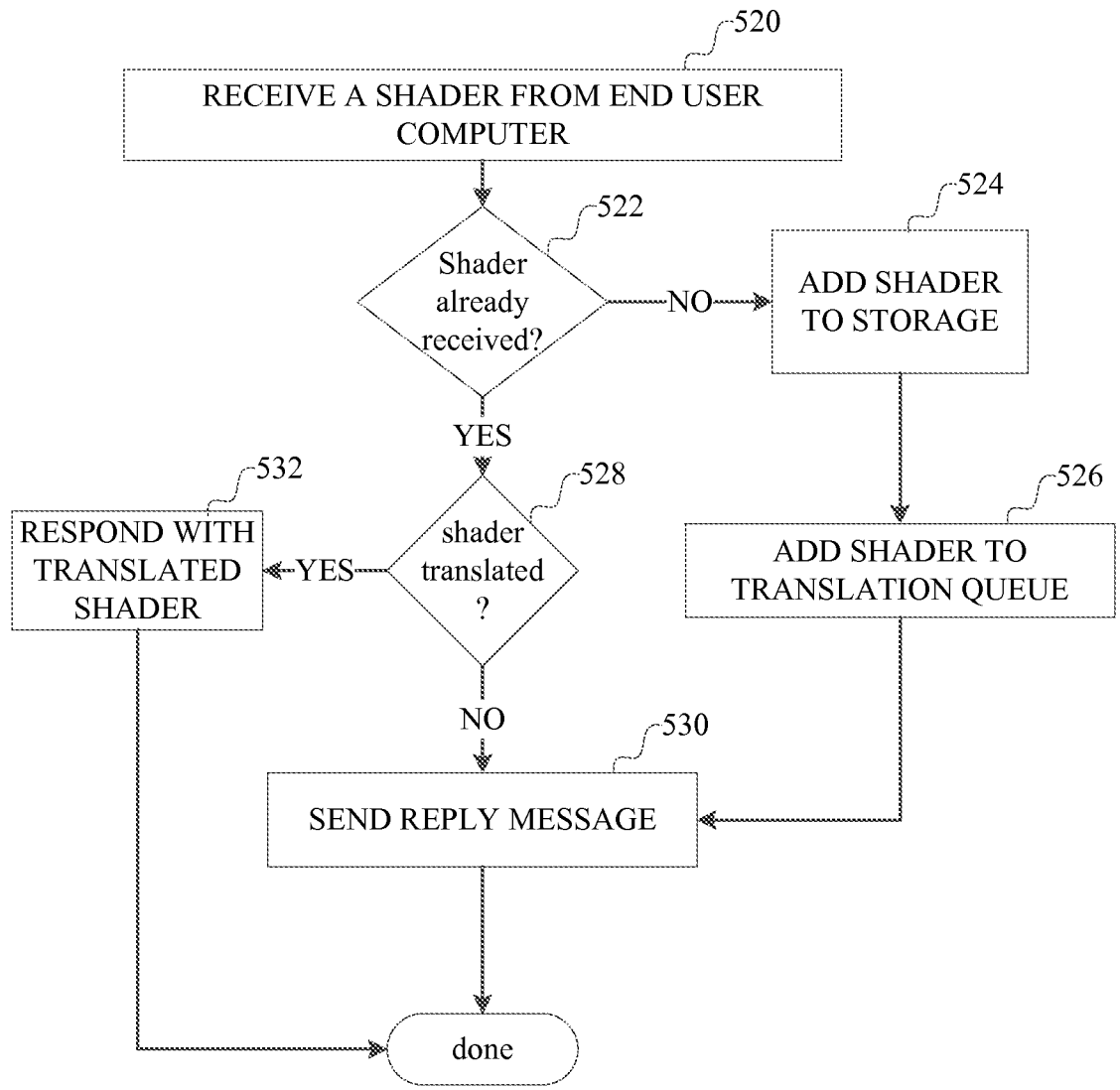
FIG. 5B is a flow chart illustrating an example implementation of remote translation by a server computer.

In FIG. 5B, an implementation of the corresponding operation of the service will now be described. The service receives 520 a shader from an end user computer. The service determines, as indicated at 522, whether an equivalent shader has been received previously, possibly based on a request from another end user computer. For example, the service can determine from the data stored in storage 324 (FIG. 3) whether the shader has already been received and/or translated. In response to a determination that the shader is not in the server computer, the shader is added 524 to storage. The shader also can be added 526 to a queue for translation. If the shader has already been received, but has not yet been translated, as determined at 528, or if the shader has just been added to the queue for translation, the server computer can respond 530 to the end user computer with a reply message indicating that the shader was successfully received. If the shader has already been received and translated, then the server computer can respond 532 to the end user computer with a reply message providing the translated shader.

In another implementation, the service can collect received shaders in a queue and periodically execute a batch translation process. In such an implementation, the steps 5238 and 532 of the process of FIG. 5B can be omitted.

Figure 6:
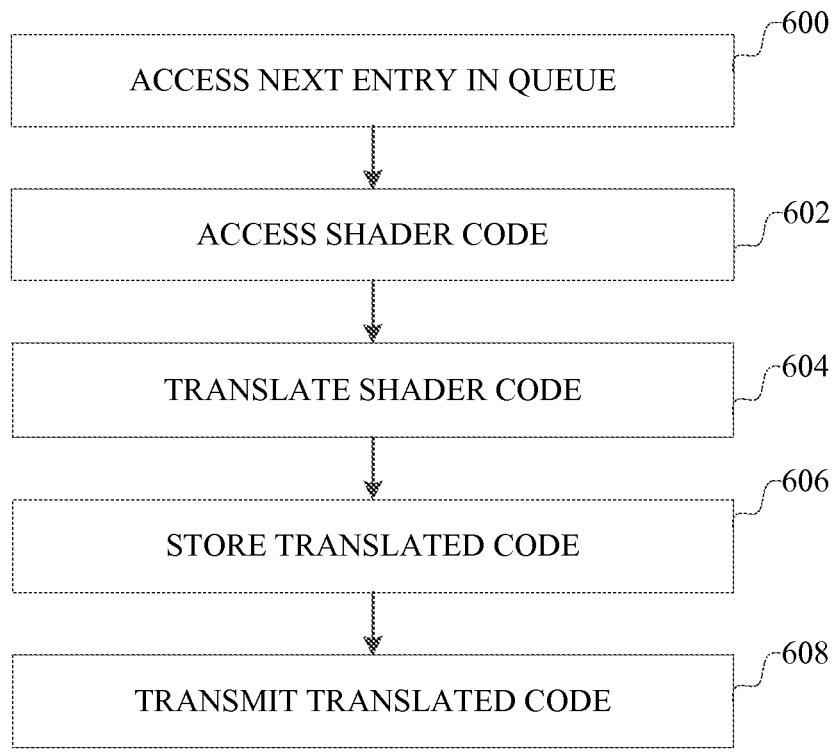
FIG. 6 is a flow chart illustrating an example implementation of translation by a server computer.
Figure 7:
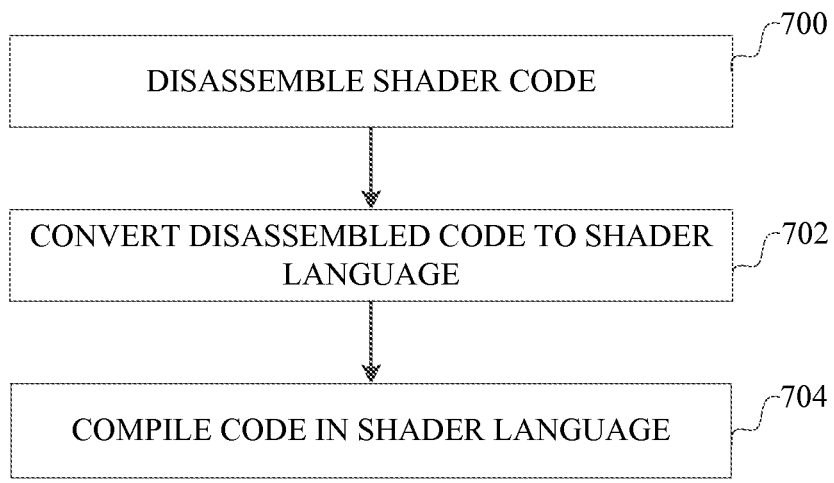
FIG. 7 is a flow chart illustrating an example implementation of translation.

An example of translation of a shader will now be described in connection with FIGS. 6 and 7.

To translate the shader, the service, in one implementation, can use a translator module such as shown in FIG. 3B and which uses a queue populated in response to requests from end user computers, as described in FIG. 5B. The translator module can operate in a batch mode to periodically process the queue of shaders. The translator module accesses (600) a next entry in the queue. The shader code to be translated, corresponding to this entry in the queue, is then accessed (602). This shader code is translated (604). After translation, the translation module stores (606) the translated code in the directory for the application. In the translation module is not operating in a batch mode, the translation module can transmit (608) the translated code to any end user computer that requested translation of that shader, or is likely to request a translation of that shader in the future. For instance, any end user computer with the associated application installed may request translation of that shader in the future. In this way, an early user of an application may cause the system to translate and distribute a shader to the end user computers of other later users. The end user computers of the later users may never encounter an untranslated shader. When operating in a batch mode, translated shaders may be packaged into updates in a manner described below in connection with FIG. 8. After translating a shader and storing the translated shader, the translator module can continue with processing the next item in the queue, as indicated at 610.

The translation of a shader can be performed in several ways. In one example implementation, described in FIG. 7, includes several steps. First, the translator module disassembles (700) the original executable shader code into an intermediate format, using standard code disassembly techniques. The translator module then converts (702) the disassembled code into a shader language, such as HLSL. The output of step 702 generally can be any shader language for which there is a compiler that can output executable shader code for the GPU 100 of FIG. 1. Next, the original shader in the shader language is compiled (704) for the target graphics processing unit.

Figure 8:
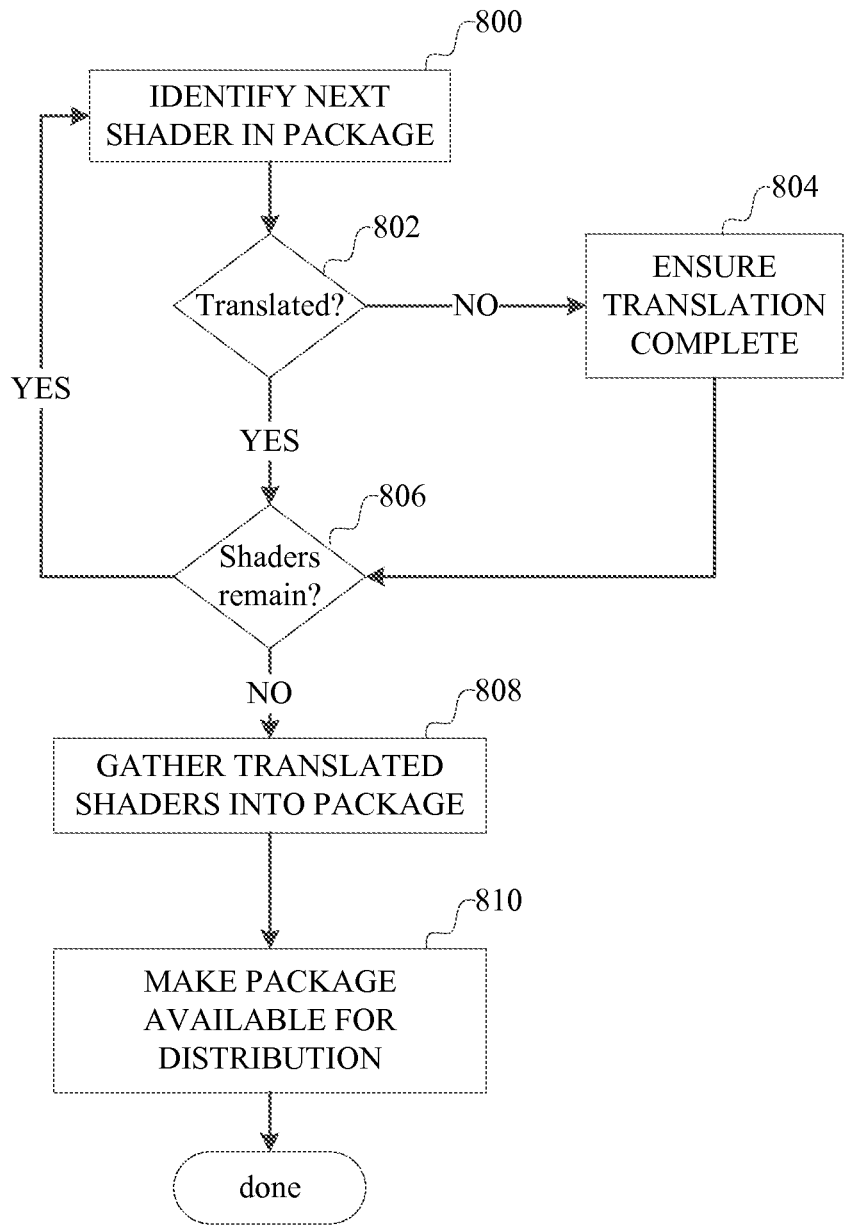
FIG. 8 is a flow chart illustrating an example implementation of packaging.

Turning now to FIG. 8, an example implementation of packaging and distributing translated shaders, aggregated from multiple end user computers, will now be described. This example in FIG. 8 applies to one package for one application, and can be used to process one subdirectory such as shown in FIG. 4. In this implementation, the packaging module ensures that all of the translated versions of shaders in the directory are available. Thus, the packaging module identifies 800 a next shader in the package subdirectory. If this shader has been processed, as determined at 802, and if more shaders remain to be processed, as determined at 804, the process repeats. If the shader has not yet been processed, the packaging module ensures 806 that it is translated. After all of the shaders for the current package have been processed, the translated shaders are gathered 808 into a package. This package is then made available 810 for distribution.

Distribution generally can occur periodically or on demand, such as by request from an end user computer, or based on a schedule or other event. An example implementation of distribution is described in FIGS. 9 through 11. In this implementation, an end user computer requests an update to an application; it is assumed in this description that the end user computer is authorized to receive the update.

Figure 9:
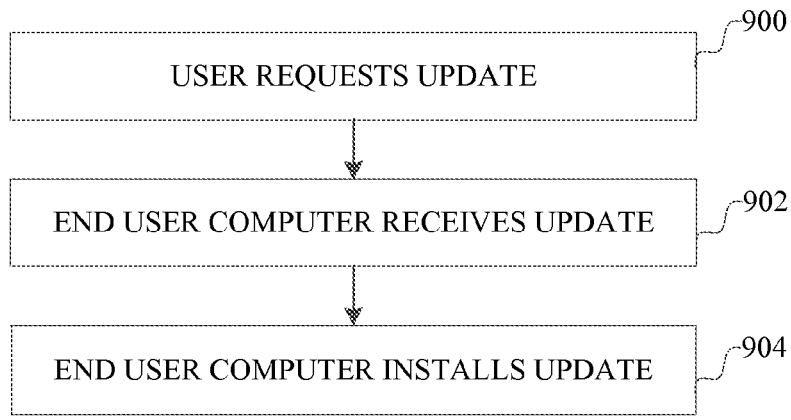
FIGS. 9-11 are flow charts illustrating an example implementation of distribution.

In FIG. 9, the end user computer requests 900 an update by transmitting a request to the service for an update. For example, the end user computer 900 can indicate, in the request, its current update. The end user computer receives 902 the update package and installs 904 the update package. By installing the update, the translated shaders are placed in a location, such as a file in storage which is associated with the corresponding application, which can be used to populate the application's runtime shader cache.

Figure 10:
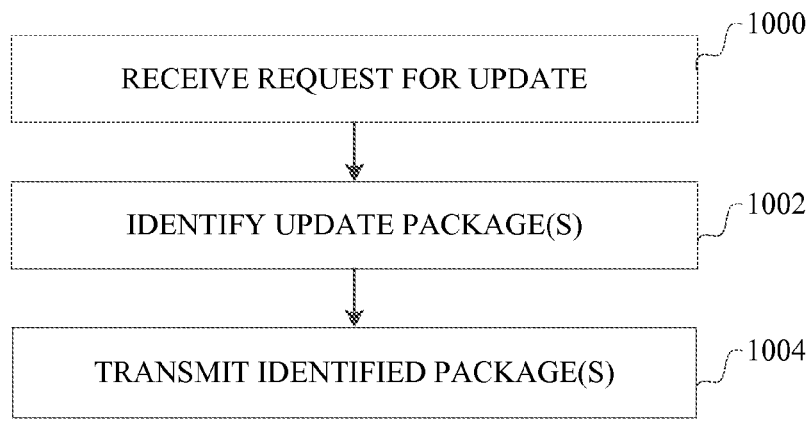
Figure 11:
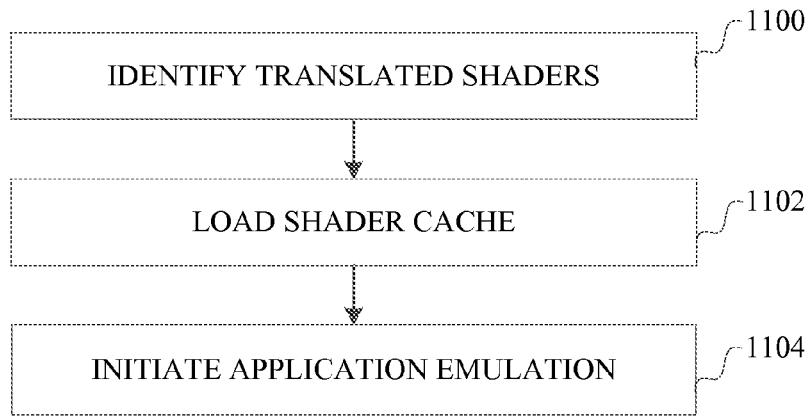

In FIG. 10, a download module of the service receives 1000 a request from the end user computer. The download module identifies 1002 an update package for the end user computer. For example, the download module can use any indication of a current version of updates for the end user computer to identify one or more updates to transmit to the end user computer. The download module then transmits 1004 the identified packages to the end user computer.

After the end user computer installs the updates, the end user computer may be instructed by an end user to execute the application that uses the update. The emulator on the end user computer, in response to an application being executed, identifies 1100 whether there are any translated shaders for the application. Such identification by the emulator can be readily made by having the translated shaders stored in a predetermined location for the application. The translated shaders are then loaded 1102 into the shader cache for the application. The execution of the application through the emulator then can be initiated 1104.

By having end user computers discover and transmit shaders from applications that are being emulated on those end user computers, the process of discovery and translation can be distributed over many end user computers. Further, updates to those applications can be redistributed to the end user computers based on the aggregated translated shaders. Further still, the emulation software can be effective without having to contain a local shader compiler.

Having now described an example implementation, FIG. 12 illustrates an example of a computer with which such techniques can be implemented to provide an emulator. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), rack mounted computers, multiprocessor systems, microprocessor-based systems, programmable consumer electronics, networked personal computers, minicomputers, mainframe computers, and distributed computing environments that include any of the above types of computers or devices, and the like.

Referring now to FIG. 12, a computer generally incorporates a general purpose computer with computer programs providing instructions to be executed by one or more processors in the computer. Computer programs on a general purpose computer generally include an operating system and applications. The operating system is a computer program running on the computer that manages access to various resources of the computer by the applications and the operating system. The various resources generally include the one or more processors, storage (including memory and storage devices), communication interfaces, input devices and output devices. FIG. 12 illustrates an example of computer hardware of a computer in which an operating system, such as described herein, can be implemented using computer programs executed on this computer hardware. The computer hardware can include any of a variety of general purpose or special purpose computing hardware configurations of the type such as described in FIG. 12.

With reference to FIG. 12, an example computer 1200 includes at least one processing unit 1202 and memory 1204. The computer can have multiple processing units 1202 and multiple devices implementing the memory 1204. A processing unit 1202 can include one or more processing cores (not shown) that operate independently of each other. Additional co-processing units also can be present in the computer, including but not limited to one or more graphics processing units (GPU) 1240, one or more digital signal processing units (DSPs) or programmable gate array (PGA) or other device that can be used as a coprocessor. The memory 1204 may include volatile devices (such as dynamic random access memory (DRAM) or other random access memory device), and non-volatile devices (such as a read-only memory, flash memory, and the like) or some combination of the two. Other storage, such as dedicated memory or registers, also can be present in the one or more processors. The computer 1200 can include additional storage, such as storage devices (whether removable or non-removable) including, but not limited to, magnetically-recorded or optically-recorded disks or tape. Such additional storage is illustrated in FIG. 12 by removable storage device 1208 and non-removable storage device 1210. The various components in FIG. 12 are generally interconnected by an interconnection mechanism, such as one or more buses 1230.

A computer storage medium is any medium in which data can be stored in and retrieved from addressable physical storage locations by the computer. Computer storage media includes volatile and nonvolatile memory, and removable and non-removable storage devices. Memory 1204, removable storage 1208 and non-removable storage 1210 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 1200 may also include communications connection(s) 1212 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 1212 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media. One or more processes may be running on the processor and managed by the operating system to enable data communication over such connections.

The computer 1200 may have various input device(s) 1214 such as a keyboard, mouse or other pointer or touch-based input devices, stylus, camera, microphone, sensors, such as accelerometers, thermometers, light sensors and the like, and so on. The computer may have various output device(s) 1216 such as a display, speakers, and so on. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 1210, communication connections 1212, output devices 1216 and input devices 1214 can be integrated within a housing with the rest of the computer, or can be connected through various input/output interface devices on the computer, in which case the reference numbers 1210, 1212, 1214 and 1216 can indicate either the interface for connection to a device or the device itself as the case may be.

A computer generally includes an operating system, which is a computer program running on the computer that manages access to the various resources of the computer by applications. There may be multiple applications. The various resources include the memory, storage, input devices, output devices, and communication devices as shown in FIG. 12.

The various modules in FIGS. 1, 2, 3A and 3B, as well as any operating system, file system and applications on a computer in FIGS. 1, 3A and 12, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data or configure the computer to implement various components or data structures.

Accordingly, in one aspect, a computer is configured to emulate execution of a graphics application for a first graphics processing unit. The computer comprises a second graphics processing unit, storage and one or more central processing units configured to execute an emulator application. The emulator application configures the computer to convert first commands for the first graphics processing unit to second commands that instruct the second graphics processing unit. The emulator application further configures the computer to manage a resource cache including translated resources for the second graphics processing unit for a plurality of resources. The emulator application further configures the computer, in response to a first command referencing a resource and translated resources for the second graphics processing unit for the resource not being in the resource cache, to request translation of the resource from a remote computer.

In one aspect, a computer includes a means, operative in response to a first command referencing a resource and the translated resource for the second graphics processing unit not being in a resource cache, for requesting translation of the resource from a remote computer.

In one aspect, a computer system comprises one or more server computers configured by one or more computer programs so as to be comprising storage configured to store code for a resource for a plurality of applications. The computer system further comprises a receiving module comprising an input configured to receive requests from end user computers, the requests including an identifier of a resource for an application and the resource. The computer system further comprises a translation module comprising an input configured to access the resource from the storage and an output configured to store a translated resource on the storage. The computer system further comprises a packaging module comprising an input configured to access the translated resource for an application and an output configured to provide an update package comprising the translated resource for a plurality of resources from a plurality of end user computers. The computer system further comprises a distribution module comprising an input configured to receive a request for an update package for an application and an output configured to provide the update package for the application to an end user computer.

In one aspect, a computer system comprises a means for receiving, from a plurality of end user computers, resources for an application. The computer system further comprises means for translating the received resources. The computer system further comprises means for distributing the translated received resources to end user computers.

In another aspect, a process performed by one or more server computers comprises receiving requests from a plurality of end user computers, a request including an identifier of a resource for an application and the resource, translating the received resource, packaging the translated resource for an application into an update package for the application, and distributing the update package to the plurality of end user computers.

In any of the foregoing aspects, the computer can be configured to identify, in response to execution of an application by the emulator, translated resources for the application and load the translated resources into the resource cache.

In any of the foregoing aspects, the resource cache can include a memory configured to store translated resources for the second graphics processing unit and a cache index configured to store, for each resource of the plurality of resources, a location in the memory of the translated resource.

In any of the foregoing aspects, the computer can be further configured to request an update package from a service, the update package including translated resources.

In any of the foregoing aspects, the computer can be further configured by the emulator application to add, in response to a determination that the translated resource for the second graphics processing unit for the resource is not in the resource cache, an indication of the resource to a queue for translation.

In any of the foregoing aspects, the computer can be further configured by the emulator application to update, in response to translation of the resource by the remote computer, the entry in the cache index for the resource to provide an indication of the location in the memory of the translated resource.

In any of the foregoing aspects with a receiving module, the receiving module can further comprise an output configured to provide a reply message to an end user computer. Such a reply message can indicate, for example, that a translated shader code to the end user computer in response to the request from the end user computer for translation of a shader, or that translated shader code is not yet available to the end user computer in response to the request from the end user computer for translation of a shader.

In any of the foregoing aspects, packaging translated resources can comprise periodically identifying translated resources for a plurality of resources for an application, and generating an update package including the identified translated resources.

In any of the foregoing aspects with a distribution module, the distribution module can distribute an update package to an end user computer in many ways. For example, such distribution can be performed in response to a request from the end user computer, or according to a schedule defined for the one or more server computers, or according to a schedule defined by the end user computer.

In any of the foregoing aspects, in response to a request from the end user computer, the translated resource for a resource included in the request, can be transmitted to the end user computer.

In any of the foregoing aspects, distributing update packages can comprise receiving a request from an end user computer for an update package and transmitting the update package to the end user.

In any of the foregoing aspects, update packages can be periodically transmitted to end user computers.

In any of the foregoing aspects wherein the resource is a shader, translating the shader comprises disassembling the shader, generating a representation of the shader in a shader language derived from the disassembled shader.

In any of the foregoing aspects, the resource can be stored in a first directory of a file system and translated resources can be stored in a second directory of the file system, the first and second directories being subdirectories of a directory in the file system for the application.

In any of the foregoing aspects, the resource can comprise a resource generated through execution of the graphics application at runtime and the resource cache can comprise a cache of translated resources.

In any of the foregoing aspects, the resource can comprise a shader and the resource cache can comprise a shader cache.

In any of the foregoing aspects, the resource can comprise a texture and the resource cache can comprise a texture cache.

In any of the foregoing aspects, the application can include a game application including a plurality of resources, such as shaders.

In any of the foregoing aspects an end user computer can receive an update package including a plurality of translated resources for an application on the end user computer with the end user computer having transmitted the resources for translation.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer configured to emulate execution of a graphics application for a first graphics processing unit, the computer comprising:
   a second graphics processing unit;
   storage;
   one or more central processing units configured to execute an emulator application, the emulator application configuring the computer to:
   convert first commands for the first graphics processing unit, generated by execution of the graphics application by the emulator application, to second commands that instruct the second graphics processing unit;
   manage a resource cache including translated resources for the second graphics processing unit for a plurality of resources;
   in response to a first command referencing a resource, and a determination that a translated resource for the second graphics processing unit corresponding to the resource referenced by the first command is not in the resource cache, skip rendering a second command corresponding to the first command, and transmit a request for the translated resource over a computer network to a remote computer for translation of the resource by the remote computer, and receive the translated resource in response to the request.

2. The computer of claim 1, wherein the resource comprises a shader and the resource cache comprises a shader cache.

3. The computer of claim 2, wherein the emulator application, when executed by the computer, is configured to, in response to execution of an application by the emulator, identify translated shaders for the application and load the translated shaders into the shader cache.

4. The computer of claim 2, wherein the shader cache comprises a memory configured to store executable code for the second graphics processing unit and a cache index configured to store, for each shader of the plurality of shaders, a location in the memory of the executable code for the shader.

5. The computer of claim 2, wherein the computer is further configured to:
   request an update package from a service, the update package including translated shaders.

6. The computer of claim 2, wherein the computer is further configured by the emulator application to:
   in response to a determination that the executable code for the second graphics processing unit for the shader is not in the shader cache, add an indication of the shader to a queue for translation.

7. The computer of claim 2, wherein the computer is further configured by the emulator application to:
   in response to translation of the shader by the remote computer, update the entry in the cache index for the shader to provide an indication of the location in the memory of the executable code for the second graphics processing unit for the shader.

8. A computer system, comprising:
   a server computer comprising a processor and storage, wherein the storage is configured to store resources and translated resources for a plurality of applications, and wherein the server computer is configured by one or more computer programs executed by the processor such that the server computer further comprises:
   a receiving module executed on the processor and comprising an input configured to receive requests, over a computer network, from end user computers executing an application, the requests including an identifier of a resource for the application and the resource, wherein the resource comprises a shader;
   a translation module executed on the processor and comprising an input and an output configured to access the storage and operative to, in response to a determination that a translated resource for a received resource is not stored in the storage, generate and output the translated resource to the storage;
   a packaging module executed on the processor and comprising an input configured to access the translated resources for a plurality of resources for the application from a plurality of received requests and an output configured to provide an update package to the storage and comprising the translated resources for the plurality of resources for the application received in the plurality of received requests from the end user computers; and
   a distribution module executed on the processor and comprising an output configured to provide the update package for the application to the end user computers having the application over a computer network.

9. The computer system of claim 8, wherein the receiving module further comprises an output configured to provide translated shader code to the end user computer in response to the request from the end user computer for translation of a shader.

10. The computer system of claim 9, wherein the receiving module further comprises an output configured to provide an indication that translated shader code is not yet available to the end user computer in response to the request from the end user computer for translation of a shader.

11. The computer system of claim 8, wherein the distribution module distributes an update package to an end user computer in response to a request from the end user computer.

12. The computer system of claim 8, wherein the distribution module distributes an update package to an end user computer according to a schedule defined for the one or more server computers.

13. The computer system of claim 8, wherein the distribution module distributes an update package to an end user computer according to a schedule defined by the end user computer.

14. A computer-implemented process, performed by a server computer comprising a processor and storage, wherein the storage is configured to store resources and translated resources for a plurality of applications, and wherein the server computer is configured by one or more computer programs executed by the processor such that the server computer performs a process comprising:
- receiving, over a computer network, requests from a plurality of end user computers executing an application, a request including an identifier of a resource for the application and the resource, wherein the resource comprises a shader;
- in response to a determination that a translated version of a received resource from the received requests is not stored in the storage, translating the received resource and storing the translated resource in the storage;
- packaging the translated resources for a plurality of resources for the application from a plurality of received requests into an update package for the application and storing the update package in the storage; and
- distributing the update package to the plurality of end user computers over a computer network.

15. The computer-implemented process of claim 14, further comprising storing the shader code in a first directory of a file system and the translated shader code in a second directory of the file system, the first and second directories being subdirectories of a directory in the file system for the application.

16. The computer-implemented process of claim 14, further comprising transmitting to an end user computer, in response to a request from the end user computer, the translated shader code for a shader included in the request.

17. The computer-implemented process of claim 14, wherein packaging comprises:
- periodically identifying translated shader code for a plurality of shaders for an application; and
- generating an update package including the identified translated shader code.

18. The computer-implemented process of claim 14, wherein distributing comprises receiving a request from an end user computer for an update package and transmitting the update package to the end user.

\* \* \* \* \*